Patented May 23, 1950

2,508,904

UNITED STATES PATENT OFFICE 2,508,904

PYRIDYLETHYL SULFONIC ACIDS

Francis E. Cislak, Indianapolis, Ind., assignor to Reilly Tar & Chemical Corporation, Indianapolis, Ind., a corporation of Indiana No Drawing. Application July 30, 1947, Serial No. 764,909

11 Claims. (Cl. 260—283)

This invention relates to a new class of chemical compounds and to the process of making them. More particularly it relates to pyridylethyl sulfonic acids and to the process of making them. These pyridylethylsulfonic acids have the following general formula:

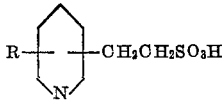

R represents hydrogen, an alkyl, a cycloalkyl or an aryl group.

In general the compounds of my present invention may be prepared by reacting a vinylpyridine with sulfurous acid. The sulfurous acid may be added to the vinylpyridine as such, or it may be formed by passing sulfur dioxide into a solution of the vinylpyridine, or by treating a suspension of a sulfite or a bisulfite in vinylpyridine with an acid.

My invention will be described more fully in conjunction with the following examples. It should be understood, however, that these examples are given by way of illustration only and that the invention is not to be limited by the details set forth therein. The parts are by weight.

EXAMPLE 1

*2-pyridylethyl sulfonic acid*

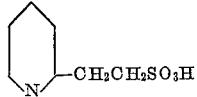

Fifty-two parts of 2-vinylpyridine is dissolved in 200 parts of ethyl alcohol and 20 parts of water. The resulting solution is heated to about 50° C. and, while it is stirred, sulfur dioxide is passed into or through it. The addition of sulfur dioxide is continued until the weight increase of the solution is about 35 parts. After the solution has absorbed the required amount of sulfur dioxide it is stirred for about ½ hour longer. Then the reaction mixture is cooled in an ice bath and the 2-pyridylethyl sulfonic acid, which crystallizes from the solution, is separated as by filtration. As so recovered the 2-pyridylethyl sulfonic acid is sufficiently pure for most purposes; it may, if desired, be further purified by recrystallization from appropriate solvents. After recrystallization from 80% alcohol the 2-pyridylethyl sulfonic acid has a melting point of 265–67° C.

EXAMPLE 2

*4-pyridylethyl sulfonic acid*

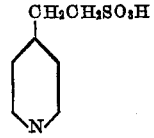

If in place of the 2-vinylpyridine of Example 1 I use 4-vinylpyridine I obtain 4-pyridylethyl sulfonic acid. This compound has a melting point of 277–82° C.

EXAMPLE 3

*6-methyl-2-pyridylethyl sulfonic acid*

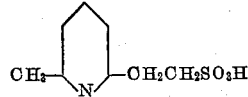

If in place of the 2-vinylpyridine of Example 1 and the 4-vinylpyridine of Example 2 I use 6-methyl-2-vinylpyridine I obtain 6-methyl-2-pyridylethyl sulfonic acid. This compound has a melting point of 282–3° C.

EXAMPLE 4

*2-pyridylethyl sulfonic acid*

Fifty-two parts of 2-vinylpyridine is dissolved in 200 cc. of ethyl alcohol and 20 cc. of water; to this solution is added 52 parts of finely divided sodium bisulfite. The resulting suspension is heated to about 60° C. and 50 parts of concentrated hydrochloric acid is added slowly to it; the suspension is stirred continually during the addition of the hydrochloric acid. An instantaneous reaction occurs; a precipitate of sodium chloride is formed and sulfurous acid is liberated. Crystals of 2-pyridylethyl sulfonic acid separate from the solution as the reaction proceeds. After all the hydrochloric acid is added the reaction mixture is stirred for about ½ to 1 hour longer; then it is cooled in an ice bath and the crystalline precipitate of 2-pyridylethyl sulfonic acid and sodium chloride is removed by filtration. The sodium chloride is separated from the pyridylethyl sulfonic acid by recrystallization from 80% alcohol.

The above examples illustrate the manner in which compounds of my invention may be made. In addition to the compounds specifically described in the above examples other pyridylethyl sulfonic acids may be made in a similar manner. Thus, if I start with 2-vinyl-5-ethylpyridine in place of 2-vinylpyridine I may obtain 5-ethyl-2-pyridylethyl sulfonic acid. If in place of the 2-vinylpyridine or the 4-vinylpyridine I start with a vinylbenzopyridine (vinylquinoline) I obtain a benzopyridylethyl sulfonic acid:

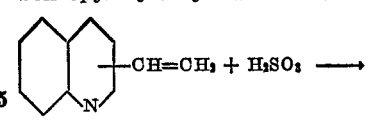

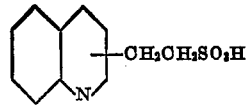

The compounds of my present invention may be used in the synthesis of various pharmaceuticals, insecticides, wetting agents, photographic chemicals, etc.

I claim as my invention:

1. The class of 2-pyridylethyl sulfonic acids and 4-compounds consisting of pyridylethyl sulfonic acids, having the formula

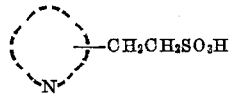

where

represents a pyridine nucleus.

2. 2-pyridylethyl sulfonic acid having the formula

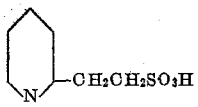

3. 4-pyridylethyl sulfonic acid having the formula

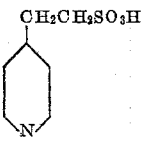

4. 2-benzopyridylethyl sulfonic acid having the formula

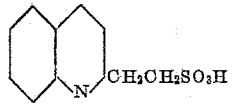

5. The process of preparing compounds of the class consisting of 2-pyridylethyl sulfonic acids and 4-pyridylethyl sulfonic acids, having the formula

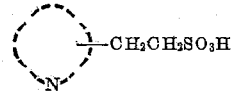

where

represents a pyridine nucleus, which comprises reacting a compound of the class consisting of a 2-vinylpyridine and a 4-vinylpyridine with sulfurous acid.

6. The process of preparing compounds of the class consisting of 2-pyridylethyl sulfonic acids and 4-pyridylethyl sulfonic acids, having the formula

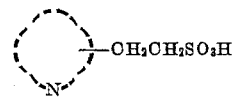

where

represents a pyridine nucleus, which comprises reacting a mixture of a compound of the class consisting of a 2-vinylpyridine and a 4-vinylpyridine and bisulfite with an acid.

7. The compounds of claim 1 in which the ethylsulfonic acid group is attached to the 2-position of the pyridine nucleus.

8. The compounds of claim 1 in which the ethylsulfonic acid group is attached to the 4-position of the pyridine nucleus.

9. The process of claim 5 in which the vinylpyridine is a 2-vinylpyridine.

10. The process of claim 5 in which the vinylpyridine is a 4-vinylpyridine.

11. The process of claim 5 in which the vinylpyridine is a benzovinylpyridine.

FRANCIS E. CISLAK.

REFERENCES CITED

The following references are of record in the file of this patent:

UNITED STATES PATENTS

| Number | Name | Date |
|---|---|---|
| 1,880,646 | Wulff | Oct. 4, 1932 |
| 2,272,159 | Cislak | Feb. 3, 1942 |
| 2,300,741 | Cislak | Nov. 3, 1942 |
| 2,338,571 | Cislak | Jan. 4, 1944 |
| 2,388,499 | Riethof | Nov. 6, 1945 |

OTHER REFERENCES

Birechte de deut Chem., vol 20 (1887), p. 1643.
Beilstein, 4th Ed. vol. 11, p. 120.
Schickh, Chem. Abstracts, vol. 27, p. 1002.

Certificate of Correction

Patent No. 2,508,904                                                                 May 23, 1950

FRANCIS E. CISLAK

It is hereby certified that errors appear in the printed specification of the above numbered patent requiring correction as follows:

Column 3, lines 5 and 6, strike out "2-pyridylethyl sulfonic acids and 4-compounds consisting of pyridylethyl" and insert instead *compounds consisting of 2-pyridylethyl sulfonic acids and 4-pyridylethyl*;

and that the said Letters Patent should be read with these corrections therein that the same may conform to the record of the case in the Patent Office.

Signed and sealed this 5th day of September, A. D. 1950.

[SEAL]

THOMAS F. MURPHY,
*Assistant Commissioner of Patents.*